United States Patent [19]

Sylvestro et al.

[11] Patent Number: 5,368,441
[45] Date of Patent: Nov. 29, 1994

[54] TURBINE AIRFOIL INCLUDING DIFFUSING TRAILING EDGE PEDESTALS

[75] Inventors: Joseph A. Sylvestro, New Britain; Indrik Linask, Tolland; Brian K. Beabout, Coventry, all of Conn.

[73] Assignee: United Technologies Corporation, Hartford, Conn.

[21] Appl. No.: 980,817

[22] Filed: Nov. 24, 1992

[51] Int. Cl.⁵ .................................................. F01D 5/18
[52] U.S. Cl. .............................. 416/97 R; 416/97 A; 416/90 A
[58] Field of Search ................. 416/90 R, 95, 96 R, 416/97 R, 97 A

[56] References Cited

U.S. PATENT DOCUMENTS

| | | | |
|---|---|---|---|
| 4,303,374 | 12/1981 | Braddy | 416/97 R |
| 4,565,490 | 1/1986 | Rice | 416/97 A |
| 4,650,949 | 3/1987 | Field | 416/90 R |
| 4,653,983 | 3/1987 | Vehr | 416/97 R |
| 5,102,299 | 4/1992 | Frederick | 416/97 R |

FOREIGN PATENT DOCUMENTS

| | | | |
|---|---|---|---|
| 0185599 | 6/1986 | European Pat. Off. | 416/97 R |
| 3141801 | 6/1991 | Japan | 416/97 R |

*Primary Examiner*—Edward K. Look
*Assistant Examiner*—Mark Sgantzos

[57] ABSTRACT

A turbine airfoil having a cut-back trailing edge and a plurality of diffusing flow dividers upstream of the cut-back trailing edge is disclosed. Various construction details are developed which provide ejection of a diffusing film of cooling fluid over a cut-back trailing edge. In one particular embodiment, a turbine airfoil includes a plurality of radially spaced flow dividers extending between a pressure wall and a suction wall. Each flow divider includes a rounded leading edge, a pair of parallel sidewalls downstream of the leading edge, and a pair of converging sidewalls downstream of the parallel sidewalls. Adjacent sidewalls of adjacent flow dividers form flow channels having a constant area channel and a diffusing section. The diffusing section includes a covered portion upstream of the cut-back trailing edge and an uncovered portion extending over the cut-back trailing edge.

17 Claims, 2 Drawing Sheets

2

TURBINE AIRFOIL INCLUDING DIFFUSING TRAILING EDGE PEDESTALS

TECHNICAL FIELD

The present invention relates to turbomachines, and more particularly to internally cooled turbine airfoils.

BACKGROUND OF THE INVENTION

A typical turbomachine, such as a gas turbine engine, has an annular axially extending flow path for conducting working fluid sequentially through a compressor section, a combustion section, and a turbine section. The compressor section includes a plurality of rotating airfoils, referred to as compressor blades, which add energy to the working fluid. Upon exiting the compressor section, the working fluid enters the combustion section. Fuel is mixed with the compressed working fluid and the mixture is ignited to thereby add more energy to the working fluid. The resulting products of combustion are then expanded within the turbine section. The turbine section includes another plurality of rotating airfoils, referred to as turbine blades, which extract energy from the expanding fluid. A portion of this extracted energy is transferred back to the compressor section via a rotor shaft interconnecting the compressor section and turbine section. The remainder of the energy extracted may be used for other functions.

Efficient transfer of energy between the working fluid and the airfoils of the compressor and turbine sections is dependant upon many parameters. One of these is the orientation of the rotating airfoil relative to the flow direction of the working fluid. For this reason, a stage of non-rotating airfoils, referred to as vanes, are typically located upstream of each stage of rotor blades. The vanes properly orient the flow for engagement with the blades. Another parameter is the size and shape of the airfoils, both blades and vanes. Typically the airfoils are as thin in the lateral dimension as possible to reduce the weight of the airfoil without affecting the airfoil shape. A limitation to the lateral dimension is the location within the airfoil of cooling passages. Cooling passages are needed to maintain the temperature of the airfoil within acceptable limits.

The amount of energy produced by the combustion process is proportional to the temperature of the resulting products of combustion. For a given fuel and oxidant, increasing the energy of combustion results in a corresponding increase in the temperature of the products of combustion. The allowable temperature of the turbine structure exposed to the hot working fluid, however, typically provides a temperature limit for the combustion process. This temperature limit governs the energy generated by the combustion process.

The allowable temperature within the turbine section is dependant upon material characteristics and stress levels. Turbine materials are maintained below their melting temperature. The allowable temperature of a given component is further limited by the stress level of the component. Allowable stress level is adversely affected by temperature. Therefore, components subject to high stress must be maintained at temperatures well below their melting temperature. This is especially significant for turbine components subject to rotational forces, such as turbine airfoils.

One method to prevent overheating of turbine components is to cool the turbine section using cooling fluid drawn from the compressor section. Typically this is fluid which bypasses the combustion process and is thereby at a much lower temperature than the working fluid in the turbine section. The cooling fluid is flowed through and around various structure within the turbine section. A portion of the cooling fluid is flowed through the turbine airfoils, which have internal passageways for the passage of cooling fluid. As the cooling fluid passes through these passageways, heat is transferred from the turbine airfoil surfaces to the cooling fluid. The passageways include a variety of mechanisms, such as trip strips and pedestals, to maximize heat transfer between the cooling fluid and the turbine airfoil. The cooling fluid exits into the flow path through cooling holes distributed about the airfoil section of the turbine airfoil.

A detrimental result of using compressor fluid to cool the turbine section is a lower overall efficiency for the gas turbine engine. Since a portion of the compressed fluid is bypassing various stages of the turbine section, there is no transfer of useful energy from the compressor fluid to the bypassed turbine stages. The loss of efficiency is balanced against the higher combustion temperatures which can be achieved by cooling with compressor fluid. This balancing emphasizes the need to efficiently utilize the cooling fluid drawn from the compressor section. Efficient utilization of cooling fluid requires getting maximum heat transfer from a minimal amount of cooling fluid.

The above art notwithstanding, scientists and engineers under the direction of Applicants' Assignee are working to develop means to efficiently cool turbine airfoils to maximize the overall efficiency of a turbomachine.

DISCLOSURE OF THE INVENTION

According to the present invention, a turbine airfoil includes a trailing edge and internal diffusing means which ejects a film of cooling fluid over the trailing edge.

According further to the present invention, the diffusing means includes a plurality of radially spaced flow dividers extending laterally between a pressure wall and a suction wall of the airfoil. The dividers are teardrop shaped in cross-section and include a pair of converging sidewalls each of which combines with a converging sidewall of an adjacent divider to define a diffusing channel between adjacent dividers. The pressure wall has a first lip and the suction wall has a second lip which extends axially downstream of the first lip. The first lip and second lip define a cut-back trailing edge region. The diffusing channel begins upstream of the cut-back trailing edge region and extends in a downstream direction over the cut-back region.

According to a specific embodiment, each of the dividers includes a rounded leading edge and a pair of parallel sidewalls upstream of the canted sidewalls. Each of the parallel sidewalls combines with a parallel sidewall of an adjacent divider, the pressure wall, and the suction wall to define a constant area flow channel immediately upstream of the diffusing channel.

A principle feature of the present invention is the diffusing channel located partially within the airfoil and formed by the sidewalls of the dividers. Another feature is the downstream extension of the diffusing channel located in the cut-back trailing edge region. A principle feature of the particular embodiment is the constant area channel immediately upstream, relative to the flow of cooling fluid, of the diffusing channel.

A primary advantage of the present invention is the efficient use of cooling fluid flowing through the turbine airfoil as a result of the diffusing channel forming a film of cooling fluid over the cut-back region of the turbine airfoil trailing edge. Since the diffusing channel begins upstream of the cut-back region and extends downstream over the cut-back region, the cooling fluid exits the trailing edge in a controlled diffusion and the diffusion continues over the cut-back region. "Controlled diffusion" as used herein is defined as diffusion in a manner which avoids flow separation and which evenly and fully distributes the flowing fluid. The film of cooling fluid provides a buffer between the hot working fluid and the cut-back region flow surface. A primary advantage of the particular embodiment is the control of the diffusion within the diffusing channel as a result of the constant area channel immediately upstream. The constant area channel provides a organized flow of cooling fluid entering the diffusing channel. "Organized flow" as used herein is defined as fluid flow in which the majority of flow streamlines are parallel and have a common direction. Another advantage of the particular embodiment is the additional cooling which occurs as a result of heat transfer between the cooling fluid flowing within the constant area channel and the walls defining the constant area channel.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
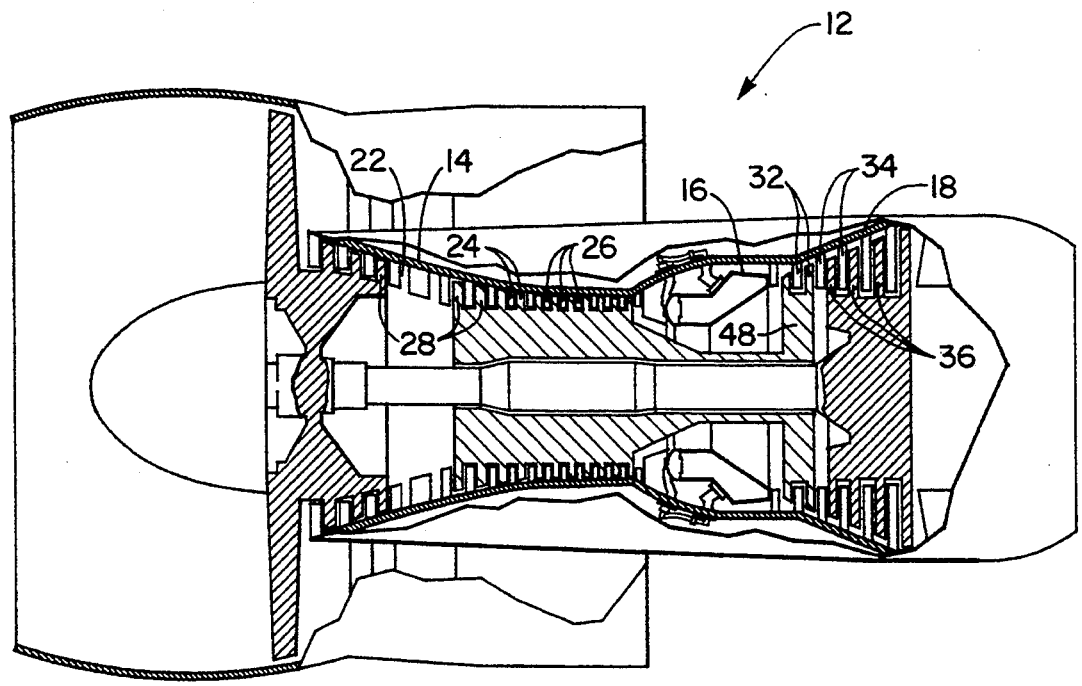
FIG. 1 is a cross-sectional side view of a gas turbine engine.

FIG. 1 is an illustration of a gas turbine engine 12 shown as a representation of a typical turbomachine. The gas turbine engine includes a compressor 14, a combustor 16, and a turbine 18. An axially directed flowpath 22 extends through the gas turbine engine and defines a passage for working fluid. Working fluid entering the compressor engages a plurality of compressor airfoils 24 including vanes 26 and rotating blades 28. The compressor blades engage the working fluid to add energy to the working fluid. Working fluid exiting the compressor enters the combustor where it is mixed with a supply of fuel and the mixture is ignited within the combustor. The products of combustion are then expanded within the turbine. The turbine includes a plurality of turbine airfoils 32 including turbine vanes 34 and turbine blades 36. The turbine blades engage the working fluid to extract energy from the working fluid. The turbine vanes orient the working fluid for optimal engagement between working fluid and the axially adjacent, downstream turbine blades.

Figure 2:
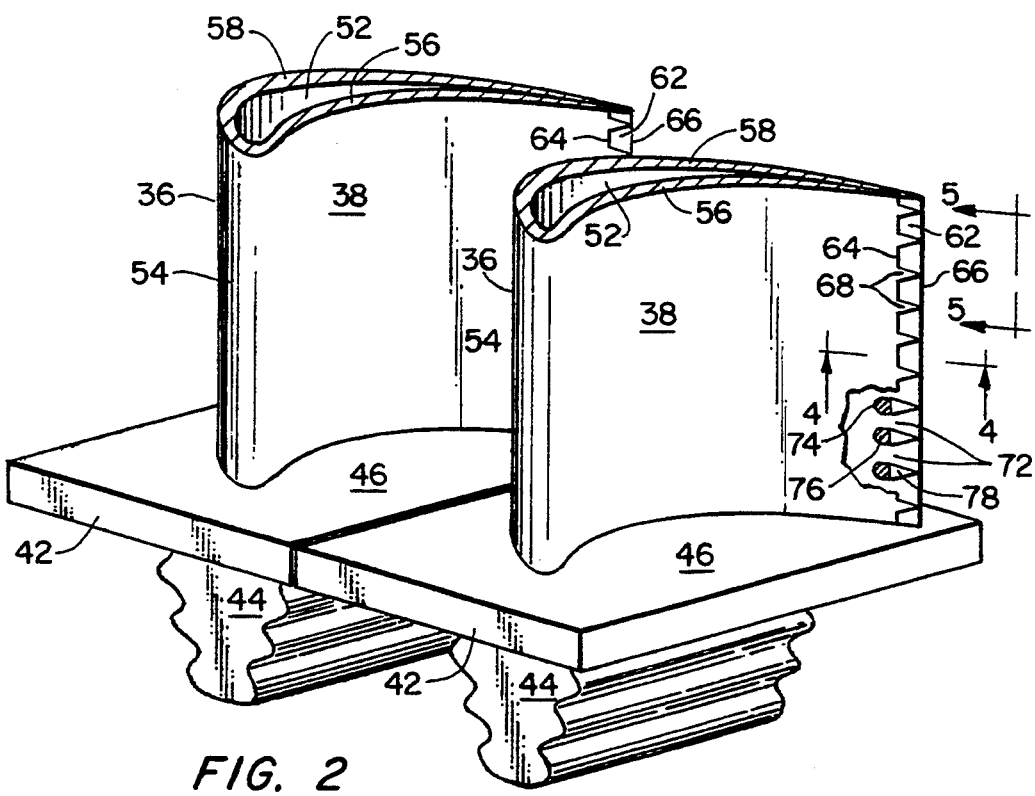
FIG. 2 is a side view of adjacent turbine airfoils, partially cut-away to show a trailing edge including a plurality of flow dividers.

A turbine airfoil 32 in the form of a turbine blade 36 is shown in FIG. 2. The turbine blade includes an airfoil portion 38, a platform 42, and a root portion 44. The airfoil portion extends through the flowpath and engages the working fluid flowing through the flowpath. The platform extends laterally about the turbine blade to form a radially inner flow surface 46. The flow surface discourages the working fluid from flowing radially inward and not engaging the airfoil portion of the blade. The root portion is engaged with a rotor disk 48 to radially secure the turbine blade. Cooling passages 52 extend through the turbine blade and are in fluid communication with a supply of cooling fluid. The cooling passages pass through the airfoil portion to transfer heat from the airfoil surfaces to the cooling fluid and to maintain the temperature of the turbine blade below a maximum allowable temperature.

The turbine blade includes a leading edge 54, a pressure surface 56, a suction surface 58, and a cutback trailing edge 62. The cutback trailing edge defines means for ejecting cooling fluid from the airfoil portion of the blade. The cooling passages are disposed between the pressure surface wall and the suction surface wall. The cutback trailing edge is defined by a pressure surface lip 64 and a suction surface lip 66 which extends downstream of a pressure surface lip. The cutback trailing edge includes a plurality of radially spaced flow dividers 68 which extend laterally between the pressure surface wall and the suction surface wall. Cooling channels 72 are disposed between adjacent flow dividers and provide fluid communication between the internal cooling passages of the turbine blade and the flowpath.

Figure 3:
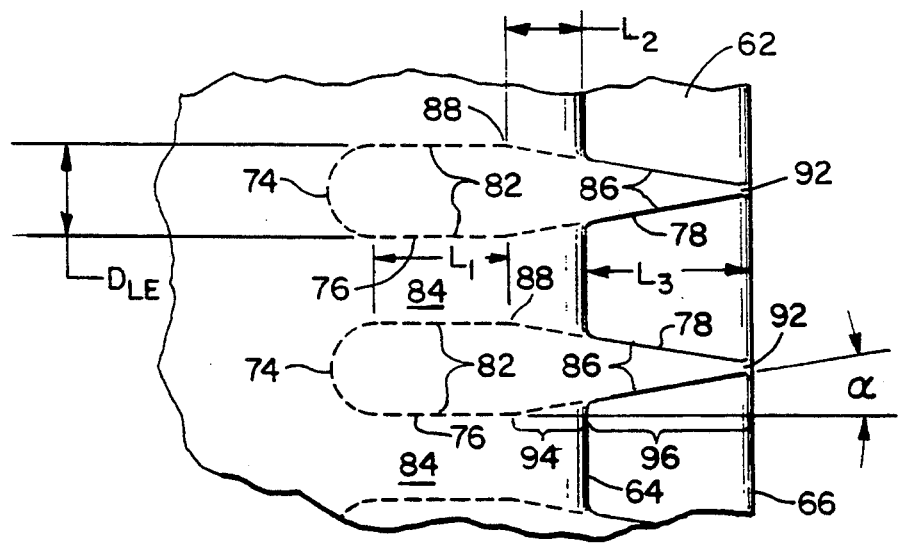
FIG. 3 is a cross-sectional view of a pair of adjacent flow dividers with a dashed line indicating the location of the flow dividers.
Figure 4:
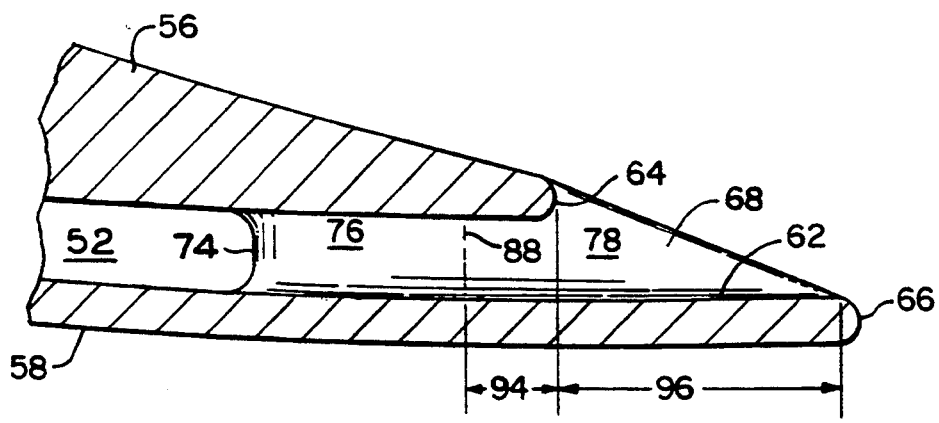
FIG. 4 is a sectional view taken along line 4—4 of FIG. 2.

Each of the flow dividers is teardrop shaped in cross-section as shown in FIG. 3. Each of the flow dividers include a rounded leading edge 74, a constant thickness section 76, and an axially converging section 78. The rounded leading edge faces inward towards the cooling flow passages within the turbine blade. As shown in FIG. 3, the rounded leading edge is a semi-circle in cross-section, although it should be apparent to those skilled in the art that other non-circular blunt shapes may be equally applicable to the leading edge of the flow dividers.

The constant thickness section includes a pair of parallel sidewalls 82 which are radially spaced from each other. Each of the parallel sidewalls is also radially spaced from and parallel to a parallel sidewall of an adjacent flow divider. The parallel sidewalls of adjacent flow dividers, in conjunction with the pressure wall and suction wall, define constant area channels 84 of constant width between the flow dividers.

The converging section of the flow dividers includes a pair of converging sidewalls 86, each of which extends from the downstream end 88 of a parallel side and nearly converges at their downstream end 92 with the opposing angled side. As shown in FIG. 3, the converging sidewalls do not completely converge into a point but approach each other. The angled sides of adjacent flow dividers, in conjunction with the pressure wall and suction wall, define a covered diffusing region 94 between adjacent flow dividers. This diffusing region begins upstream of the pressure surface lip and extends downstream between the pressure surface wall and the suction surface wall. An uncovered diffusing region 96 defined by the angled sides and suction wall, extends downstream of the pressure surface lip and over the suction surface lip.

During operation, hot working gases flow over the airfoil portion of the turbine blade and heat up the airfoil portion. Cooling fluid is flowed through the passages within the airfoil portion to provide cooling of the turbine airfoil. A portion of this cooling fluid is ejected out through the cutback trailing edge and into the flowpath. The cooling fluid exiting the cutback trailing edge flows through the channels defined by the radially disposed flow dividers. Heat is transferred directly from the pressure wall and suction wall to the cooling fluid and indirectly via the flow dividers. The exiting cooling fluid first impinges upon the flow divider leading edge to provide impingement type cooling of the flow divider and to indirectly transfer heat from the pressure wall and suction wall. The cooling fluid then passes through the constant area channel in which additional heat is transferred between the cooling flow flowing through the constant area channel and the flow dividers, suction wall, and pressure wall. In addition, the cooling fluid flowing through the constant area channel becomes more fully developed and organized as it passes through the constant area channel before exiting into the diffusing region. The cooling fluid exiting the constant area channel then enters the covered diffusing region where the diffusing of the cooling fluid begins. As the cooling fluid is diffused, the static pressure within the cooling fluid increases and the velocity of the cooling fluid decreases. The covered diffusing region permits the cooling fluid to begin diffusing before engaging with the working fluid flowing externally to the airfoil portion and over the suction surface lip. Upon exiting the covered diffusing region the cooling fluid continues diffusing over the suction surface lip and provides a film of cooling fluid over the suction surface lip. This film of cooling fluid provides a buffer between the hot working fluid and the suction surface lip and cools the suction surface wall. Beginning the diffusion upstream of the pressure surface lip provides means to initiate a controlled diffusion before the diffusing cooling fluid exits the airfoil portion and is engaged by the hot working fluid flowing over the airfoil portion. Controlled diffusion upstream of the pressure lip results in an orderly and efficient diffusing film of cooling fluid over the suction surface lip.

Figure 5:
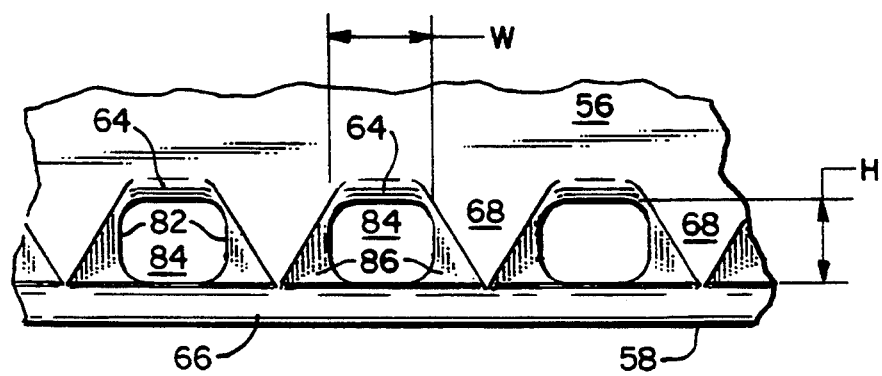
FIG. 5 is an end view taken along line 5—5 of FIG. 2.

Certain parameters of the flow divider shape are believed to optimize the performance of the flow dividers. These parameters are defined in terms of the hydraulic diameter of the straight portion of the flow channels between adjacent flow dividers. The hydraulic diameter is defined herein by the following equation:

$$D_H = \frac{4 \cdot A}{P} \qquad [Eq. 1]$$

wherein $D_H$ is the hydraulic diameter, A is the cross-sectional area of the constant area channel, and P is the perimeter of the channel. For the channel as shown in FIG. 5, the cross-sectional area a may be calculated by the following equation $$A = \frac{\pi H^2}{4} + H \cdot (W - H) \qquad [Eq. 2]$$

wherein H is the height of the channel and W is the width of the channel, as shown in FIG. 5. The perimeter of such a channel may be calculated from the following equation $$P = \pi H + 2 \cdot (W - H) \qquad [Eq. 3]$$

The flow divider leading edge as shown in FIG. 3 is a semi-circle having a diameter $D_{Le}$ wherein $D_{Le}$ as shown in FIG. 3 also corresponds to the thickness of the constant thickness section of the flow divider. It is suggested that $D_{Le}$ should be within the following range:

$$1 D_H \leq D_{Le} \leq 3 D_H$$

Factors to be considered in determining $D_{Le}$ are the flow requirements through the trailing edge and the amount of heat transfer desired. If $D_{Le}$ is too large, there may not be sufficient flow area to eject the cooling fluid. This may limit the flow of cooling fluid through the turbine airfoil and thereby negatively impact the amount of heat transfer upstream of the trailing edge. In addition, if $D_{Le}$ is too small, impingement cooling of the leading edge will be minimal.

The constant thickness section includes a width equal to $D_{Le}$ as discussed previously and a length $L_1$. It is suggested that the length $L_1$ be equal to or less than three hydraulic diameters $D_H$. Although benefits may be obtained even without a constant area channel, it is beneficial to have a constant area channel to form an organized flow of cooling fluid entering the diffusing section. A long constant area channel, however, may increase the risk of overheating if a channel becomes blocked.

The angled sides of the converging region form an angle $\alpha$ with a line parallel to the straight sides of the constant thickness section, as shown in FIG. 3. It is suggested that the diffusion angle $\alpha$ be selected according to the following equation $$2° \leq \alpha \leq 10°$$

Diffusion angles $\alpha$ less than 2° may not provide sufficient diffusion and diffusion angles $\alpha$ greater than 10° may result in flow separation from the angled sides depending upon other flow characteristics through the channels.

The covered diffusion region is defined by the diffusion angle discussed previously and a length $L_2$ defining the distance between the downstream end of the constant thickness section and the pressure surface lip. It is suggested that the length $L_2$ be equal to or less than 5 hydraulic diameters $D_H$. It should be noted, however, that the length $L_2$ may be limited by practical considerations, such as the body thickness of the airfoil section in the cutback region.

The uncovered diffusing region has a length $L_3$ which corresponds to the length of the cutback or the axial distance between the pressure surface lip and the suction surface lip. It is suggested that the length $L_3$ be less than or equal to 7 hydraulic diameters $D_H$. The actual length $L_3$ may depend on the body shape of the airfoil portion and the suction surface lip temperatures. If the length $L_3$ is too long, there may not be sufficient film cooling over the downstream end.

The flow channels themselves, as discussed previously, have a height dimension H and a width dimension W. The height dimension H is dependent upon the body shape of the airfoil section and upon the wall thickness of the pressure surface wall and the suction surface wall. The width W is dependent upon the flow area needed to eject cooling fluid from the airfoil portion and upon the cooling needed in the trailing edge region in the airfoil portion. The necessary flow area will be divided among the plurality of flow channels. The cooling requirements in the trailing edge region will determine how many flow dividers are needed in the region to transfer heat from the pressure surface wall and suction surface wall to the cooling fluid flowing through the channels.

Although the invention as shown in FIGS. 2-5 is applied to a turbine blade, it should be obvious to those skilled in the art, that the invention is equally applicable to turbine vanes or any turbomachine airfoil having internal cooling and a cooling exit disposed along the trailing edge of the turbine airfoil.

Although the invention has been shown and described with respect with exemplary embodiments thereof, it should be understood by those skilled in the art that various changes, omissions, and additions may be made thereto, without departing from the spirit and scope of the invention.

What is claimed is:

1. An airfoil for a turbine engine, the turbine engine disposed about a longitudinal axis and including a source of cooling fluid and an axially extending flow path for working fluid, the airfoil extending through the flow path and including:
   a pressure wall extending axially and radially about one side of the airfoil, the pressure wall including a pressure wall lip;
   a suction wall extending axially and radially about the opposite side of the airfoil, the suction wall spaced from the pressure wall and including a suction wall lip, wherein the suction wall lip is axially downstream of the pressure wall lip, and wherein the suction wall lip and pressure wall lip define a trailing edge;
   an internal passage in fluid communication with the source of cooling fluid, the internal passage defining a cooling fluid flowpath with cooling fluid exiting the airfoil the trailing edge; and
   a plurality of radially spaced flow dividers extending laterally between the pressure wall and the suction wall and streamwise through the cooling fluid flowpath, and wherein each divider includes:
      a flow divider leading edge;
      a pair of converging sidewalls, each of the pair of converging sidewalls extending to a point downstream of the pressure wall lip such that a portion of each of the dividers is exposed to the flow path, the pair of converging sidewalls converging in the downstream direction such that adjacent side walls of adjacent dividers diverge to define a covered diffusing region and an uncovered diffusing region between adjacent dividers, wherein the covered diffusing region extends from upstream of the pressure wall lip to the pressure wall lip, and the uncovered diffusing region extends from the pressure wall lip to downstream of the pressure wall lip; and
      a pair of parallel sidewalls extending downstream from the flow divider leading edge to the converging sidewalls, each of the pair of parallel sidewalls being parallel with one of a pair of parallel side walls of an adjacent divider to define a constant area channel between adjacent dividers, each of the constant area channels being immediately upstream of one of the covered diffusing regions.

2. The airfoil according to claim 1, wherein the flow divider leading edge is semi-circular in cross-section shape such that cooling fluid exiting the airfoil impinges upon the flow divider leading edge.

3. The airfoil according to claim 1, wherein the converging sidewalls form an angle a with the direction of flow between flow dividers, and wherein $2° \leq \alpha \leq 10°$.

4. The airfoil according to claim 2, wherein the converging sidewalls form an angle a with the direction of flow between flow dividers, and wherein $2° \leq \alpha \leq 10°$.

5. The airfoil according to claim 1, wherein the constant area channel has a hydraulic diameter $D_H$ and a length $L_1$ and wherein $L_1 \leq 3D_H$.

6. The airfoil according to claim 2, wherein the constant area channel has a hydraulic diameter $D_H$ and a length $L_1$ and wherein $L_1 \leq 3D_H$.

7. The airfoil according to claim 4, wherein the constant area channel has a hydraulic diameter $D_H$ and a length $L_1$ and wherein $L_1 23 3D_H$.

8. The airfoil according to claim 2, wherein the flow divider leading edge has a diameter $D_{Le}$, wherein a channel between adjacent flow dividers has a hydraulic diameter $D_H$, and wherein $D_H \leq D_{Le} \leq 3D_H$.

9. The airfoil according to claim 4, wherein the flow divider leading edge has a diameter $D_{Le}$, wherein a channel between adjacent flow dividers has a hydraulic diameter $D_H$, and wherein $D_H \leq D_{Le} \leq 3D_H$.

10. The airfoil according to claim 7, wherein the flow divider leading edge has a diameter $D_{Le}$, wherein a channel between adjacent flow dividers has a hydraulic diameter $D_H$, and wherein $D_H \leq D_{Le} \leq 3D_H$.

11. The airfoil according to claim 1, wherein the covered diffusing region extends a distance $L_2$ upstream of the pressure surface lip, wherein a channel between adjacent flow dividers has a hydraulic diameter $D_H$, and wherein $L_2 \leq 5D_H$.

12. The airfoil according to claim 1, wherein the uncovered diffusing region extends a distance $L_3$ downstream of the pressure surface lip, wherein a channel between adjacent flow dividers has a hydraulic diameter $D_H$, and wherein $L_3 \leq 7D_H$.

13. The airfoil according to claim 11, wherein the uncovered diffusing region extends a distance $L_3$ downstream of the pressure surface lip, and wherein $L_3 \leq 7D_H$.

14. The airfoil according to claim 2, wherein a channel between adjacent flow dividers has a hydraulic diameter $D_H$, and wherein $L_2 \leq 5D_H$, wherein the covered diffusing region extends a distance $L_2$ upstream of the pressure surface lip, wherein the uncovered diffusing region extends a distance $L_3$ downstream of the pressure surface lip, and wherein $L_3 \leq 7D_H$.

15. The airfoil according to claim 4, wherein a channel between adjacent flow dividers has a hydraulic diameter $D_H$, and wherein $L_2 \leq 5D_H$, wherein the covered diffusing region extends a distance $L_2$ upstream of the pressure surface lip, wherein the uncovered diffusing region extends a distance $L_3$ downstream of the pressure surface lip, and wherein $L_3 \leq 7D_H$.

16. The airfoil according to claim 7, wherein a channel between adjacent flow dividers has a hydraulic diameter $D_H$, and wherein $L_2 \leq 5D_H$, wherein the covered diffusing region extends a distance $L_2$ upstream of the pressure surface lip, wherein the uncovered diffusing region extends a distance $L_3$ downstream of the pressure surface lip, and wherein $L_3 \leq 7D_H$.

17. The airfoil according to claim 10, wherein a channel between adjacent flow dividers has a hydraulic diameter $D_H$, and wherein $L_2 \leq 5D_H$, wherein the covered diffusing region extends a distance $L_2$ upstream of the pressure surface lip, wherein the uncovered diffusing region extends a distance $L_3$ downstream of the pressure surface lip, and wherein $L_3 \leq 7D_H$.

* * * * *